United States Patent [19]
Milligan et al.

[11] 3,777,416
[45] Dec. 11, 1973

[54] SYMBOL RECOGNITION TEACHING DEVICE

[76] Inventors: James Paul Milligan, 7 Teresa Pl.; Judy Anne Milligan, 91 Saint John, S. Parkside, both of Buffalo, N.Y. 14210

[22] Filed: June 23, 1972

[21] Appl. No.: 283,083

Related U.S. Application Data
[63] Continuation-in-part of Ser. No. 185,334, Sept. 30, 1971, abandoned.

[52] U.S. Cl. ............... 35/31 C, 35/9 E, 273/157 A
[51] Int. Cl. ..................... G09b 19/02, G09b 1/06
[58] Field of Search ................ 35/9 E, 9 R, 31 R, 35/31 C, 31 D, 31 F, 31 G, 35 R, 35 D, 35 H, 35 J, 69, 70, 71, 72, 73; 273/157 A

[56] References Cited
UNITED STATES PATENTS 3,248,050   4/1966   Dickson ........................... 35/9 E X
2,971,268   2/1961   Zimmerman ......................... 35/9 R

*Primary Examiner*—Wm. H. Grieb
*Attorney*—E. Herbert Liss

[57] ABSTRACT

A device for teaching symbol recognition includes a plurality of sets of shaped configurations forming a partial outline but camouflaging a symbol having a value equal to the number of elements in or representing objects displayed by the set of configurations. The numeral "2," for example, is inherent in and partially outlined by a set of configurations having two elements. A masking card when superimposed upon the set of configurations together with exposed or unmasked portions of the elements of the set instantaneously forms an outline and background to display the symbol.

7 Claims, 3 Drawing Figures

PATENTED DEC 11 1973 3,777,416
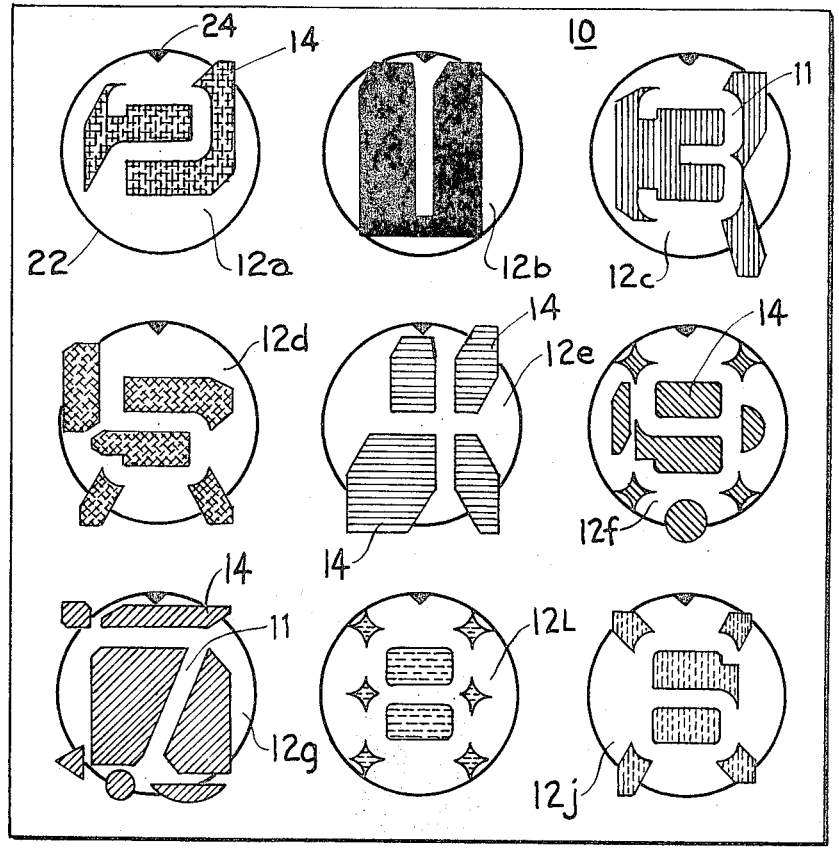
Fig.1
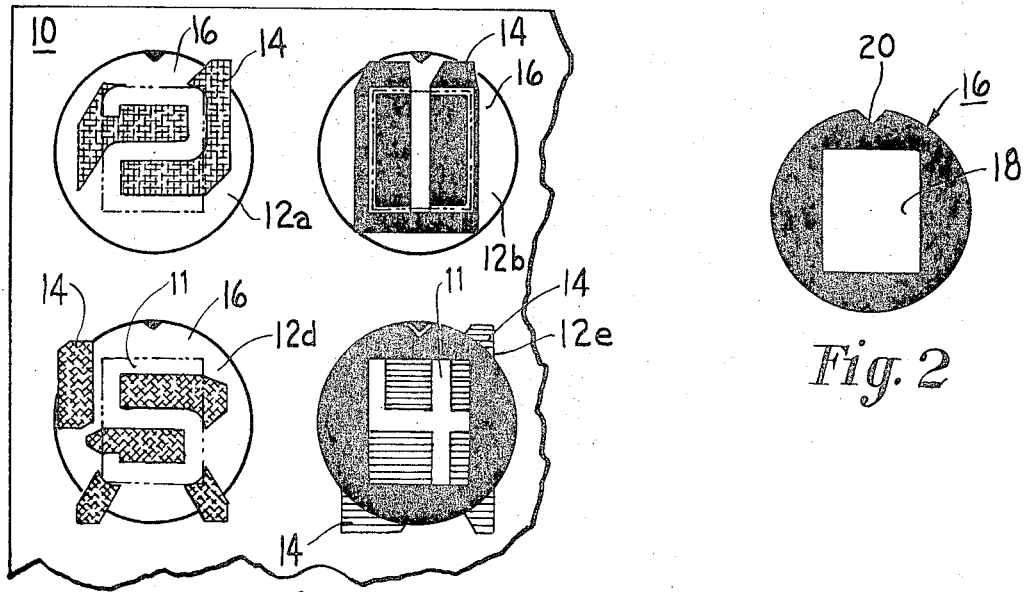
Fig.3
Fig.2

SYMBOL RECOGNITION TEACHING DEVICE

This is a continuation-in-part of application U.S. Pat. application Ser. No. 185,334 filed Sept. 30, 1971 now abandoned.

BACKGROUND OF THE INVENTION

Instruction devices for teaching the recognition of a symbol such as a numeral or letter of the alphabet generally utilize a comparison of the symbol with the value it represents. A common form of instruction device is the well known alphabet book which displays a letter of the alphabet and separately shows nearby an animal or an object wherein the letter is the initial letter of the name or description of the object. This requires a comparison and correlation of the object with the symbol. Likewise in counting books, a set including a number of objects equal in number to the value of a numeral and the numeral are separately shown on the page. Again comparison and correlation are required. Explanation to the learner that the objects are related in a certain way to the symbol constitutes an intervening step in the learning process. Examples of this type of teaching device are described in U. S. Pat. No. 3,357,116 by M. P. Bazacos which illustrates the comparison method of teaching numeral recognition and the teaching device in U. S. Pat. No. 3,302,310 by G. R. Leven which describes and illustrates the comparison method of teaching letter recognition.

SUMMARY OF THE INVENTION

The present invention employs a method of teaching symbol recognition wherein the symbol appears inherently and is instantaneously displayed in the pattern illustrated. The pattern is formed by the value represented by the symbol. The device also requires physical participation by the learner and produces sudden revelation of the symbol. The learner has an opportunity to introspectively visualize the corresponding symbol before actually seeing it. It gives the learner something to do as well as something to look at. Being in the form of a think and do game the device of the present invention offers the learner an enjoyable experience which expands the attention span.

The principal object of the present invention is to provide an improved instructional device for learning to associate a symbol with its value and at the same time to provide an attractive and entertaining game device.

Other objects and advantages of the invention will be apparent from the following detailed description taken in connection with the accompanying drawings.

DESCRIPTION OF THE DRAWINGS

FIG. 1 is a plan view of a chart incorporating configuration sets of this invention.

FIG. 2 is a plan view of the masking card.

FIG. 3 is a fragmentary plan view of the chart with the masking card superimposed on one set of configurations and its position indicated on other sets of configurations.

DETAILED DESCRIPTION OF THE PREFERRED EMBODIMENT

In FIG. 1 there is illustrated a chart 10 having a plurality of sets of configurations 12a, 12b, 12c, 12d, 12e, 12f, 12g, 12h and 12j. The configurations 12a through 12j inherently include symbols 11 consisting of Arabic numerals 1 through 9 deliberately disposed in ramdom order rather than in numerical sequence to render identification difficult. Each set of configurations differs in color to render the overall arrangement attractive and to further assist in camouflaging ready identification of the symbols. The symbols 11 inherent in the sets of configurations 12 of the illustrated embodiment are exemplified by numerals but it will of course be understood in accordance with the broader aspects of the invention that in a similar manner letters of the alphabet can be incorporated in the configurations. The elements or configurations 14 in each set of configurations 12a through 12j are illustrated herein as abstract or irregular patterns; however, it should be understood that in accordance with the broader aspects of the invention some or all of the elements 14 in each set of configurations 12a through 12j may be representations of real objects. The elements 14 are arranged relative to each other in each set of configurations 12 to form a partial outline of the inherent symbol 11 within the set of configurations. They are, however, colored and arranged so as to camouflage ready identification of the symbol.

In the illustrated embodiment the number of separate configurations or elements 14 in a set 12 of configurations corresponds to the value of the Arabic numeral inherent in that set of configurations. In accordance with the broader aspects of the invention the configurations 14 can pictorially represent objects which are identified by a symbol in the form of a letter of the alphabet inherent in each set of configurations, as for example the initial letter of the description of one or more of the elements of the configuration.

In FIG. 2 there is shown masking means which may be an apertured card 16 having a central opening 18 and a notched-out edge portion 20 as illustrated. The apertured card 16 may be superimposed on any of the sets of configurations 14 and is movable from one set of configurations to another. In FIG. 3 the set of configurations 12e is shown with the apertured masking card 16 superimposed thereon. Apertured card 16 exposes portions of the configurations 14 and masks other portions. The exposed portions of the configurations 14 within a border indicator 22 together with the periphery of the aperture 18 provide an outline and background of the inherent symbol 11. For example, looking at FIG. 3, the set of configurations 12e comprise four separate elements 14 and the inherent symbol 11 is the numeral "4." With the apertured card 16 superimposed on the set of configurations 12e the numeral "4" is outlined and readily displayed, thereby associating the four elements 14 with the symbol numeral "4." The masking card 16 is indicated in broken lines in FIG. 3 on the configurations 12a, 12b and 12d clearly illustrating the relationship of the masking means or apertured card 16 and illustrating the instantaneous disclosure of the representative symbols "2," "1" and "5" respectively. Thus the association of the numeral "2" with the two elements 14 of the set of configurations 12a, the numeral "1" inherent in the set of configurations 12e with the single configuration 14, and the five elements 14 of the set of configurations 12d with the numeral "5" is readily developed. With few repetitions the average learner will have been taught to recognize these symbols and their values.

The border indicating means 22 in the illustrated embodiment comprises a circular line forming a boundary line surrounding the inherent symbol 11. This provides a means for properly locating and positioning the masking means or apertured card 16. An indicating mark 24 on the border line 22 in each set of configurations 12 corresponds in shape to the notch 20 on the apertured card 16. Location and directional orientation of the masking card 16 with respect to the set of configurations is determined by locating the masking card within the border line 22 with the notch 20 coincident with the mark 24.

The operation of the teaching device should now be apparent. The chart 10 displaying the set or sets 12 of configurations or elements 14 is presented to the learner together with the apertured card 16. The learner is then asked to count the number of elements 14 in a particular set of configurations 12, to think of the corresponding symbol 11, and then to superimpose the apertured card 16 in proper position within the border 22 with the notch 20 mating with the mark 24, thus revealing the symbol inherent in the set of configurations 12. By so doing the learner is rapidly taught to recognize the symbol 11 having the value equivalent to the number of elements 14 in the set of configurations 12. The operation can be reversed wherein the learner is asked to properly position the apertured card 16 on the set of configurations 12, then to remove the card 16 and count the elements 14.

It should now be apparent that a unique, simple recognition teaching device has been provided which will rapidly develop symbol recognition and the association of a symbol with its value. Although a certain specific embodiment of the invention has been shown and described for the purpose of illustration it will be apparent that various modifications and other embodiments are possible within the scope of the invention. For example, rather than a single chart with a plurality of sets of configurations, each set of configurations may be displayed on an individual chart. The chart may comprise pages of a book with one or more sets of configurations on separate pages. The set of configurations associated with each symbol may be projected on a screen with a superimposed projection of the masking means 16. The elements 14 may be of other and different shapes including representations of objects and representations of objects having a name or description with an initial letter corresponding to an inherent symbol in the form of a letter in the alphabet. Other and different colors and orientations of the sets of configurations may be provided. It is, therefore, understood that the invention is not limited to the specific arrangement shown but in its broadest aspects it includes all equivalent embodiments and modifications which come within the scope of the invention.

What is claimed is:

1. A symbol recognition teaching device comprising a planar surface having a set of configurations comprising separated elements thereon, said configurations being arranged to form a partial outline of a symbol and to camouflage said symbol, said symbol being a representation of the elements comprising said set of configurations, a masking means for exposing only a portion of said configurations, said masking means taken together with the exposed portions of said configurations forming an outline and background to readily display said symbol to thereby develop in a learner a recognition ability and an association of said symbol with said set of configurations.

2. A symbol recognition teaching device according to claim 1 wherein said symbol is an Arabic numeral and said set of configurations comprises a plurality of elements corresponding in number to the value of said Arabic numeral.

3. symbol recognition teaching device according to claim 1 wherein indicator means is provided for properly positioning said masking means relative to said set of configurations.

4. symbol recognition teaching device according to claim 1 which includes a plurality of set of configurations and wherein said masking means comprises an apertured movable element adapted to be superimposed on any of said sets of configurations.

5. A symbol recognition teaching device according to claim 2 wherein said planar surface consists of a chart having a plurality of sets of configurations thereon, each set of configurations inherently including a different Arabic numeral and wherein said masking means comprises an apertured card movable from one set of configurations to another.

6. A symbol recognition teaching device according to claim 5 wherein a boundary line surrounds each symbol in a set of configurations for locating said apertured card.

7. A symbol recognition teaching device according to claim 6 wherein said boundary line includes a shaped indicator mark corresponding in shape to a cut-out portion on an edge of said apertured card for directionally orienting said card with respect to said set of configurations when said cut-out portion is coincident with said indicator mark.

* * * * *